US009363261B2

(12) United States Patent
Blakely

(10) Patent No.: US 9,363,261 B2
(45) Date of Patent: Jun. 7, 2016

(54) SYNCHRONOUS TIMESTAMP COMPUTER AUTHENTICATION SYSTEM AND METHOD

(71) Applicant: Sync-N-Scale, LLC, Burlington, WI (US)

(72) Inventor: Robert Blakely, Fort Collins, CO (US)

(73) Assignee: SYNC-N-SCALE, LLC, Burlington, WI (US)

( * ) Notice: Subject to any disclaimer, the term of this patent is extended or adjusted under 35 U.S.C. 154(b) by 0 days.

(21) Appl. No.: 14/268,065

(22) Filed: May 2, 2014

(65) Prior Publication Data

US 2015/0067794 A1    Mar. 5, 2015

Related U.S. Application Data

(60) Provisional application No. 61/818,487, filed on May 2, 2013.

(51) Int. Cl.
    *H04L 29/06* (2006.01)
(52) U.S. Cl.
    CPC .................................. *H04L 63/0846* (2013.01)
(58) Field of Classification Search
    CPC .................................................. H04L 63/0846
    USPC .................................................................. 726/5
    See application file for complete search history.

(56) References Cited

U.S. PATENT DOCUMENTS

| | | | |
|---|---|---|---|
| 6,480,946 B1 * | 11/2002 | Tomishima et al. | 711/167 |
| 6,823,453 B1 * | 11/2004 | Hagerman | 713/162 |
| 6,910,136 B1 * | 6/2005 | Wasserman et al. | 726/4 |
| 6,947,725 B2 * | 9/2005 | Aura | 455/410 |
| 7,260,653 B2 * | 8/2007 | Le Scolan et al. | 709/248 |
| 7,735,120 B2 * | 6/2010 | Wallace et al. | 726/5 |
| 7,812,682 B2 | 10/2010 | Boroditsky | |
| 8,072,273 B2 | 12/2011 | Boroditsky | |
| 8,191,125 B2 * | 5/2012 | Dellow et al. | 726/7 |
| 8,200,193 B2 * | 6/2012 | Dubois et al. | 455/411 |
| 8,364,962 B2 * | 1/2013 | Yao et al. | 713/170 |
| 8,824,332 B2 * | 9/2014 | Gao | 370/254 |
| 2004/0059952 A1 * | 3/2004 | Newport et al. | 713/202 |
| 2005/0021993 A1 * | 1/2005 | De Jongh et al. | 713/200 |
| 2006/0288413 A1 * | 12/2006 | Kubota | 726/23 |
| 2008/0276298 A1 * | 11/2008 | Leterrier et al. | 726/2 |
| 2008/0306710 A1 * | 12/2008 | Holtzman et al. | 702/178 |

(Continued)

OTHER PUBLICATIONS

Stephens et al.: The Future of Multi-Clock Systems, DesignCon 2008. Feb. 4-7, 2008.

*Primary Examiner* — Michael S McNally
(74) *Attorney, Agent, or Firm* — Nicholas A. Kees; Godfrey & Kahn, S.C.

(57) ABSTRACT

A method and system for authenticating computer nodes on a network, including providing a synchronized clock system, at a predetermined clock frequency, for use with an electronic system with a plurality of system nodes. Matching counters are connected to each of the plurality of system nodes, each of the counters being incremented in accordance with the clock frequency experienced by the system nodes to which the counters are connected. A difference is calculated between a count number at the end of a certain interval and the count number for the same counter at the beginning of the interval, to arrive at a count difference for each counter. The count difference of a particular counter is compared with the count difference of at least two other counters and, in the event that the count difference of the particular counter does not match, that node is noticed as an imposter.

6 Claims, 2 Drawing Sheets

(56) References Cited

U.S. PATENT DOCUMENTS

Figure 1:
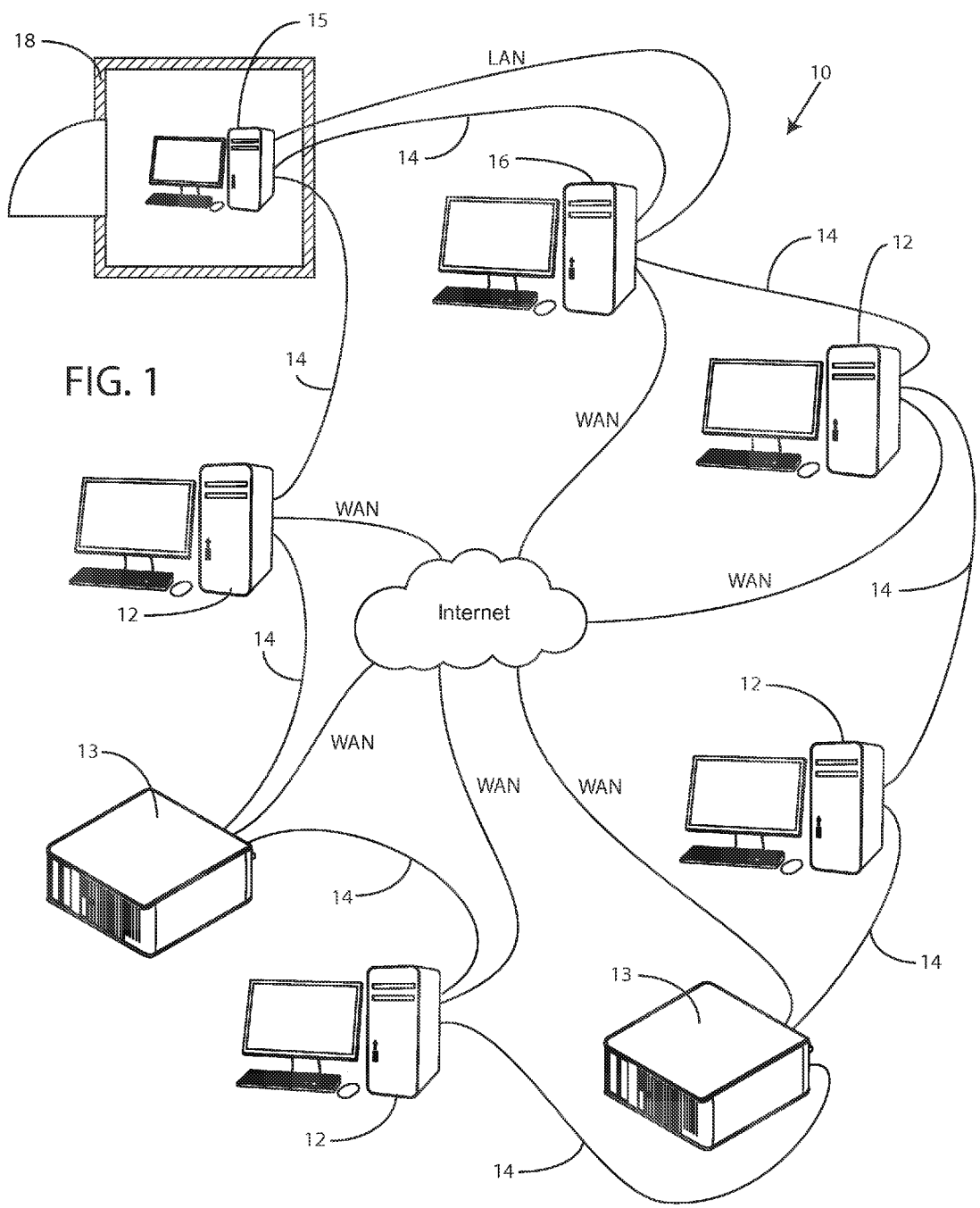

| | | | |
|---|---|---|---|
| 2008/0307494 A1* | 12/2008 | Holtzman et al. | 726/2 |
| 2009/0293130 A1* | 11/2009 | Henry et al. | 726/26 |
| 2012/0233687 A1* | 9/2012 | Metivier et al. | 726/16 |
| 2012/0324218 A1* | 12/2012 | Duren et al. | 713/158 |
| 2013/0179966 A1* | 7/2013 | Sawamura | 726/19 |

\* cited by examiner

SYNCHRONOUS TIMESTAMP COMPUTER AUTHENTICATION SYSTEM AND METHOD

CROSS REFERENCE TO RELATED APPLICATION

This application claims priority to U.S. Provisional Patent Application Ser. No. 61/818,487, filed May 2, 2013.

FIELD OF THE INVENTION

This invention relates to identity authentication, and in particular to authenticating the identity of computers connected together in a network.

BACKGROUND OF THE INVENTION

With the large scale adoption of decentralized of computing models like client-server and distributed computing, etc., the resulting topologies consist of many individual compute nodes or platforms connected together through a communication network. One of the continuing challenges of the decentralized approach is that of security, because the network implementing it also provides ready access for security breaches.

Cryptology provides a means to defeat eavesdropping and man-in-the-middle security threats along a network path from endpoint to endpoint. But a further security problem is the issue of authentication. How can it be determined that the computer at the other endpoint is really who it represents itself it to be?

Passwords are a common authenticating tool. However it is widely known that passwords have vulnerabilities.

Another authentication approach is the digital certificate. A digital certificate is based on asymmetric encryption technology that is signed by a trusted third party that can vouch for the user of the certificate. While this authentication approach is common, it requires considerable set-up and look-up time to verify the user credentials through the third party "web of trust".

The present invention relates to improvements to the systems described above, and to solutions to some of the problems raised or not solved thereby.

SUMMARY OF THE INVENTION

According to the invention, a method is provided for authenticating computer nodes on a network. The method includes providing a synchronized clock system, at a predetermined clock frequency, for use with an electronic system having a plurality of system nodes. A respective one of a matching number of counters is connected to each of the plurality of system nodes, each of the number of counters being incremented in accordance with the clock frequency experienced by the respective one of the plurality of system nodes to which the respective one of the matching number of counters is connected. For each counter, a difference is calculated between a count number at the end of a certain interval and the count number for the same counter at the beginning of the interval, to arrive at a count difference for each counter. The count difference of a particular counter is compared with the count difference of at least two other counters and, in the event that the count difference of the particular counter is not equal to the count difference of the two other counters, a notice is emitted that the node having the particular counter is an imposter.

In an alternative embodiment, over a time interval, the counter number of at least one of the plurality of known authentic system nodes is compared with a counter number from the unknown system node, and a counter difference is computed as the difference between the counter numbers of the two different counters. If the counter difference of the two different counters changes during the time interval, a notice is emitted that the unknown system node is an imposter.

The invention also provides a system for authenticating computer nodes connected together in a network. The invention includes a synchronized clock system for use with an electronic system with a plurality of system nodes. The invention further includes number of counters, each connected with at least a respective one of the system nodes, each counter having a count that is incremented according to the frequency experienced by the system node to which it is connected. A comparator is included for computing any differences between the counts from at least two of the counters and emitting an imposter notice if the differences do not match.

Other objects and advantages of the invention will become apparent hereinafter.

BRIEF DESCRIPTION OF THE DRAWING FIGURES

Figure 2:
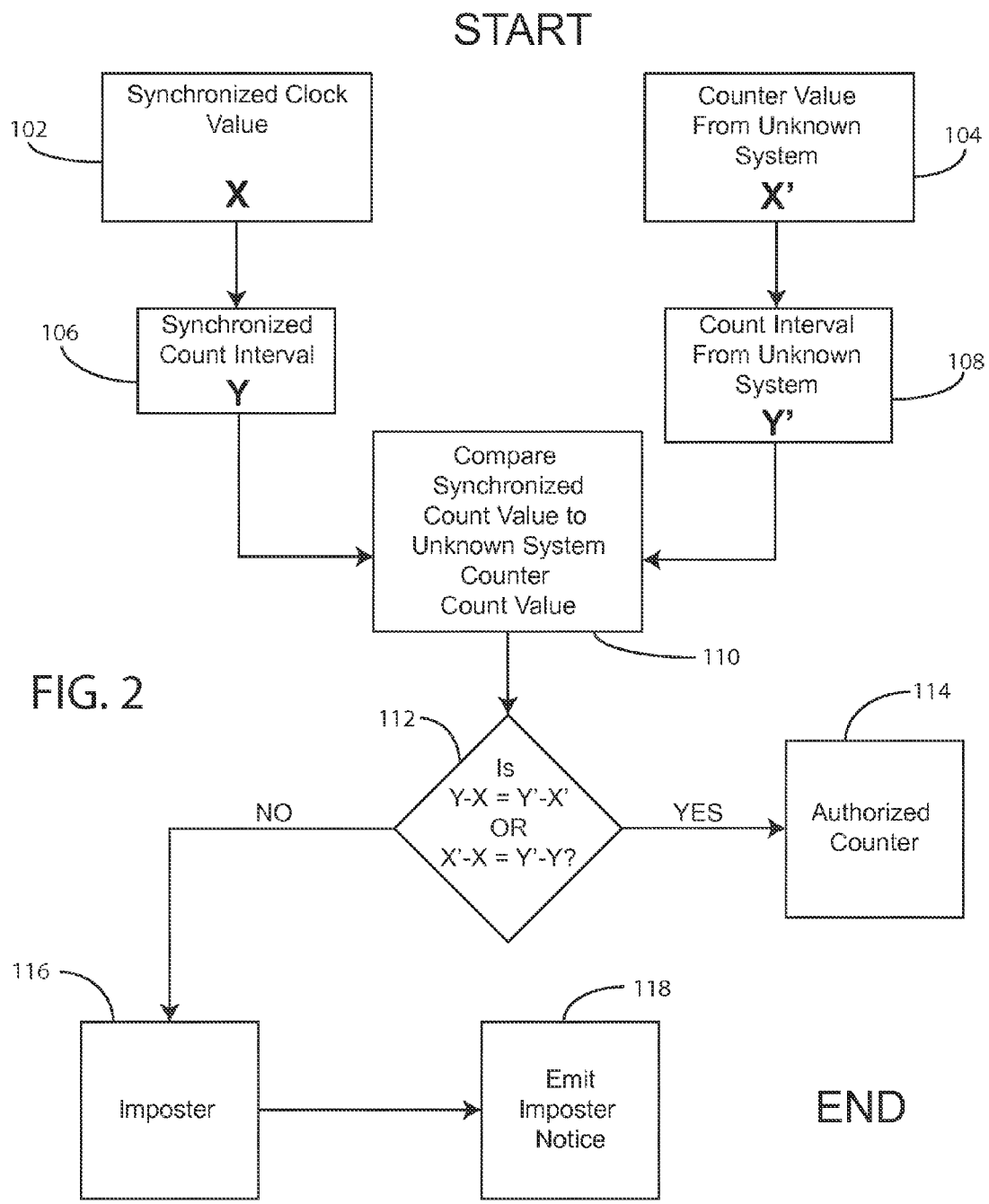

FIG. 1 is a schematic diagram of a circuit constructed according to a preferred embodiment of the invention FIG. 2 is a flow chart showing the steps followed in practicing the invention according to a preferred embodiment.

DETAILED DESCRIPTION

The present invention provides a new method of providing authentication, which will be referred to as synchronous timestamp. A counter can be used to implement the timestamp. The counter is incremented by a unique common synchronous clock frequency present at each compute node making up the desired secure network.

When multiple clocks run at precisely the same frequency, it is said that they are synchronized, or synchronous. Any two or more individual counters clocked by a synchronous frequency have the property that, over a given time interval, the count difference for all the counters will be identical. That is, if one of the counters has moved forward during a particular time interval by a certain number of counts, all the other counters clocked by the same frequency will also have moved forward by the exactly identical number of counts. If the counters are not clocked by a synchronous frequency, the count differences will not be equal.

Stated in an alternative way, if the count difference between the any two counters clocked by the same frequency is zero at the beginning of the interval, the difference will still be zero at the end of the interval. Similarly, if the difference between the numbers counted by two counters clocked by the same frequency at the beginning of the interval is a non-zero number, the difference will remain that exact same non-zero number.

In general, then, the count difference for all of the counters clocked by the same frequency will be identical throughout the time interval. If the counters are not clocked by a synchronous frequency, the count differences will change, and may even increasingly drift apart. This provides a straightforward means to determine if the clock frequencies are synchronous. Multiplying the clock frequency by factors of thousands, and comparing the count over sufficient periods of time, ensures that even the most minute frequency differences will be easily detected.

No two electromechanical frequency reference devices, such as oscillating crystals, or microelectromechanical systems (MEMS), are exactly alike. Each such device is normally manufactured for a specific nominal frequency. But in practice there is an unavoidable tolerance band surrounding the nominal target for which they are built. Device age, and differing environmental factors such as operating temperature, further ensure that the exact frequency is different, and often even slightly changing, for any electromechanical frequency reference device.

In spite of the inherent small frequency differences, it is possible to use these crystals in specially connected oscillator circuits that lock together in frequency. Examples of such circuits are disclosed in U.S. Pat. Nos. 7,812,682 and 8,072,273. The disclosures of those patents are included herein by reference in their entirety for all purposes.

The circuits disclosed in those patents are entirely synchronized in frequency, substantially regardless of distance or time. The present invention extends the use of circuits such as those to a large locked network of oscillating circuits. The synchronous frequency of this network is a combination of the individual unique crystal behaviors and is itself unique, and similarly impossible to match and replicate over time as it would be between any two individual such crystal oscillators.

Referring now to FIG. 1, consider an implementation where a secure network 10 of computer nodes 12, 15, 16, and servers 13 is desired. In the embodiment shown, each of the computer nodes 12, 16, and servers 13 are connected to the internet, except for one unconnected computer node 15, which in this example is also housed in a secure room 18 to ensure no unauthorized people have access to it. The unconnected computer node 15 may be used for outside access to the secure area of the computer nodes 12, 15, 16 and servers 13 in the secure network 10. The unconnected computer node 15 is connected via a LAN connection to a connected computer node 16, that is connected to the internet and acts as a gateway for the unconnected computer node to transmit and receive authentication requests over the internet. Furthermore, each of the computer nodes 12, 15, 16, and servers 13 has a public area and a secure area that contain data. In some embodiments, there may be multiple secure areas each assigned to different entities, but for purposes of this example, each of the computer nodes 12, 15, 16 and servers 13 has one secure area.

Each of the computer nodes 12, 15, 16, and servers 13 has access to a synchronous oscillator clock network by means of dedicated cables 14, whereby the computer nodes 12, 15, 16 may be connected in a ring arrangement, and has a timestamp counter incremented by the synchronous oscillator clock network, formed by the connection of an element within each of the computer nodes. The dedicated cables 14 each connect to a separate physical bus that includes the synchronous oscillator clock. The unique frequency generated by this synchronous oscillator clock network is used as a basis for a counter at each node 12. The count generated by that counter used for authenticating the various computer nodes belonging to this particular synchronous oscillator clock network, by means of software running at least on one of the nodes 12, 15, 16, or servers 13.

In the example shown, each of the computer nodes 12, 15, 16, and servers 13 stores a part of a shared database in a secure area, and all of the computer nodes and servers that are connected to the internet use the internet for all communication between themselves and other communication not relating to the secure database. As an example, someone in the secure room 18 makes a database inquiry that involves secure data.

The unconnected computer node 15 sends out a request to connected computer node 16, which passes the request to the rest of the secure network 10 requesting a database inquiry in the secure areas of those computer nodes and servers. To allow access to its secure area, the receiving computer node 12 or server 13 will first ask for a pulse train from the unconnected computer node 15. The pulse train includes the timestamp value and is embedded into the encrypted communications within this secure network 10. The encryption ensures that no computers outside of the secure network 10 will have access to the counter-based timestamp values. This authentication request is sent from the unconnected computer node 15 through connected computer node 16, which sends the request over the internet. The reply is sent back to the unconnected computer node 15 in the reverse, i.e., the reply comes from the internet as it passes to the unconnected computer node 15 through connected computer node 16. The pulse train is clocked by the physical bus attached to each computer node 12 or server 13 and is sent back over the internet. If the pulse train correlates on the unconnected computer 15 per the procedure outlined in FIG. 2 and described below, then the request sent from unconnected computer 15 is granted access to the secured area of the database.

As described above, the unconnected computer node 15 is shown in FIG. 1 with a dedicated LAN connection to connected computer node 16. This is because all of the members of the secure network 10 can communicate or pass along secure communications amongst themselves using the authentication procedure shown in FIG. 2 and described below to establish secure communication.

Referring now to FIG. 2, the timestamps received by each node 12 from each or any of the other nodes 12 are compared with their own internal values to determine if the node sending the timestamp is an imposter. Specifically, the system starts at 102 with a counter value X from a known synchronized system node, when an unknown system requests to be admitted to the system, and presents at 104 a particular counter value X' of its own. Each of the counters of the two systems is permitted to increment for a time, which at 106 produces a certain increment Y in the counter of the synchronized system. That same passage of time has produced an increment Y' in the counter of the unknown system at 108. Then at 110 the count value from the synchronized system is compared to the count value from the unknown system.

At the decision point 112, the count difference is calculated for each of the two systems, by calculating the difference between a count number at the end of the interval and the count number for the same counter at the beginning of the interval, to arrive at a count difference for each counter. That is, for the synchronized system, Y-X is calculated, and for the unknown system, Y'-X' is calculated. These two count differences are then compared. If the count differences of the two counters are equal to each other, then it is determined that the unknown system is authorized at 114, and access is granted. If the count differences of the two counters are not equal, then it is determined at 116 that the unknown system is not authorized, and a notice is emitted at 118 that the unknown system is an imposter. At that point access can be rejected.

In an alternative embodiment, the counter numbers of at least two different nodes are calculated, and a counter difference is calculated as the difference between the counter numbers of the two different counters. That is, the beginning counter value X from the known synchronized system node is compared with the beginning counter value X' of the unknown system, and then the ending counter value Y from the known synchronized system node is compared with the ending counter value Y' of the unknown system. These two count differences are then compared at 112. If the count differences are equal to each other, then it is determined that the unknown system is authorized at 114, and access is granted. If the count differences are not equal, then it is determined that the unknown system is not authorized at 116, and a notice is emitted at 118 that the unknown system is an imposter, and access is rejected.

Over time the secure member computer timestamp values will statistically correlate, whereas imposters cannot provide timestamp values that correlate. Therefore the synchronous timestamp values provided by crystal-based (or similar oscillator technologies) will authenticate members of this secure network.

In practical use, the present invention provides a common time base for distributed compute nodes throughout the data center. The completely synchronous design ensures no interval counter drift between any of the compute nodes. The present invention is a true distributed timing solution that scales indefinitely and has no single point of failure, unlike outdated fan-out technologies of the past. Nodes can be hotswapped, added and removed without disrupting the in-use synchronized entities.

The authentication procedure described above can be performed on a per-transaction basis, or once during the setup of a secure connection channel allowing secure coverage of multiple transactions during the life of that secure connection.

Each of the computer nodes 12, 14, 16, and servers 13 on the secure network 10 includes an application that performs the authentication procedure. The application may also run on nodes not connected to the secure network 10, but such unconnected nodes will not be able to establish a connection to the secure network because they do not have a physical connection to that specific secure network.

EXAMPLE

The present invention could be made available in a short form factor PCI Express card. Two simple plug-in connections to neighboring units forming a ring-bus topology are provided to begin use. One such PCI Express card per server platform would be sufficient. A driver could be provided to make it immediately available for use or application development. In this example, the network 10 of computer nodes 12 controls a power plant or portion of the public power grid. Each node has a PCI Express card as described above, and each node is specified to run at 900 MHz. Because of the synchronization, each of the nodes is running at 900.098765 MHz. An unknown computer 18 is added to the network, also with such a PCI Express card. Also specified to run at 900 MHz, before it is connected, it is running at 900.087654 MHz. Within 0.01 seconds, the counter in unknown computer 18 is offset from the counter in any of the nodes 12 by 11,111 counter increments, and the difference is continuing to grow. Thus the unknown computer 18 is identified as an imposter, and an imposter notice is emitted by the system.

With this invention, there exists a robust, cost-effective solution for the most demanding distributed timing applications. Real Time Clock drift, algorithmic network time degradations, and expensive alternative technologies such as GPS or atomic clocks are no longer needed. Existing data center infrastructure can be maintained. There would be no need to upgrade routers and switches to achieve timing accuracy.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

The invention claimed is:

1. A method of authenticating computer nodes on a network, comprising:
   providing a synchronized clock system, at a predetermined clock frequency, for use with an electronic system with a plurality of system nodes;
   connecting a respective one of a matching number of counters to each of the plurality of system nodes, each of the number of counters being incremented in accordance with the clock frequency experienced by the respective one of the plurality of system nodes to which the respective one of the matching number of counters is connected;
   over a time interval having a beginning and an end, for each counter, calculating the difference between a count number at the end of the interval and the count number for the same counter at the beginning of the interval, to arrive at a count difference for each counter;
   comparing the count difference of a particular counter with the count difference of at least two different counters and, in the event that the count difference of the particular counter is not equal to the count difference of the two different counters, emitting a notice that the node having the particular counter is an imposter.

2. The method as recited in claim 1, further comprising storing a part of a shared database at teach of the system modes.

3. A method of authenticating computer nodes on a network, comprising:
   providing a synchronized clock system, running at a predetermined clock frequency, for use with an electronic system with a plurality of known authentic system nodes;
   connecting a respective one of a matching number of counters to each of the plurality of known authentic system nodes, each of the number of counters being incremented in accordance with the clock frequency experienced by the respective one of the plurality of known authentic system nodes to which the respective one of the matching number of counters is connected;
   permitting the connection of an unknown system node to the plurality of known authentic system nodes,
   over a time interval, comparing the counter number of at least one of the plurality of known authentic system nodes with a counter number from the unknown system node, and computing a counter difference as the difference between the counter numbers of the two different counters;
   if the counter difference of the two different counters changes during the time interval, emitting a notice that the unknown system node is an imposter.

4. A system for authenticating computer nodes connected together in a network, comprising;
   a synchronized clock frequency system, for use with an electronic system with a plurality of system nodes;
   a number of counters, each connected with at least a respective one of the system nodes, each counter having a count that is incremented according to the synchronous clock frequency experienced by the system node to which it is connected; and a comparator for computing any differences between the counts from at least two of the counters and emitting an imposter notice if the differences do not match.

5. A system as recited in claim 4 further comprising a server for running software to make the determination about whether the counts from a particular counter does not match the others and emitting the imposter notice.

6. A system as recited in claim 4, further comprising storing a part of a shared database at each of the system nodes.

\* \* \* \* \*